Patented Jan. 23, 1934

1,944,820

UNITED STATES PATENT OFFICE 1,944,820

CEMENT ADMIXTURE

Aldo Beghelli, Lyon, France

No Drawing. Application April 19, 1932
Serial No. 606,288

4 Claims. (Cl. 106—27)

It is well known to impregnate objects or materials made of cement by bringing them into a bath of molten sulphur to increase the strength of cement either to compression strains or to friction. But it has been experienced that cement thus treated gradually loses its increased physical properties by being exposed to atmosphere and moreover under the action of dampness which rapidly causes the disintegration of sulphur-impregnated cement.

I have discovered that these draw backs had the two following causes:

(A) The treated cement contains sulphides of alkali or alkaline-earth metals, more particularly calcium sulphide. These sulphides have at first a useful effect, but after exposure to atmosphere and moisture they gradually absorb water. Due to the absorption of water, these sulphides swell and produce small cracks in the body, which upon further exposure are transformed into more or less deep crevices on the surface of the body.

(B) There remains free sulphur within the cement and this sulphur is gradually oxidized.

It has been proposed to add iron salts either in a solid state or in a solution to the untreated cement, but the results have been disappointing.

It is clear that, for avoiding this aging of sulphur-treated cement, it is necessary to prevent the formation of calcium or magnesium sulphides and to chemically fix the whole quantity of molten sulphur which impregnates the cement.

My invention has for its object a composition of matter comprising soluble silica, alumina, ferric oxide and titanic acid, this composition being added to the mortar during the kneading operation.

The proportions are preferably as follows:

| | Parts |
|---|---|
| Soluble silica ($SiO_2$; soluble in alkali) | 60 |
| Alumina ($Al_2O_3$) | 10 |
| Ferric oxide ($Fe_2O_3$) | 25 |
| Titanic acid ($2H_2TiO_3$) | 5 |

These constituents, in the pulverulent state, are thoroughly mixed together and the composition obtained is employed in a proportion of 25 to 40 per cent of the unkneaded Portland cement. This proportion varies according to the normal acidity of the cement, one effect of my composition being to increase this acidity for avoiding the presence of lime or magnesia which react on sulphur to form objectionable sulphides.

It must be noted that the constituents of my composition have been elected, on the one hand, for their individual properties and, on the other hand, for their combined properties.

Silica and alumina react on lime to form calcium silicate and aluminate, respectively. Titanic acid increases the degree of acidity of these silicates and aluminates during the kneading operation.

Ferric oxide absorbs sulphur to form iron sulphide.

By using my composition with a Portland cement mortar intended to be molded, objects or materials are obtained which have a normal acidity sufficient to avoid the presence of free lime. The combination of sulphur with the elements of cement is also greatly facilitated.

The materials or objects thus obtained are dried and then impregnated with molten sulphur. They are stable and do not swell. Their resistance is higher than that which can be obtained with the known sulphur-treated cements.

To facilitate the reaction between lime and the acids of my composition, there is preferably used for the kneading operation a solution of ferric chloride $FeCl_3$ at 0.5% of iron salt. The chlorine of this solution frees the elements which are thus in a nascent state, wherein they rapidly and easily react together.

I claim:

1. A composition adapted to be mixed with unkneaded Portland cement in order to avoid the aging of molded cement materials or objects after their impregnation with molten sulphur, said composition comprising soluble silica, alumina, ferric oxide and titanic acid.

2. A composition as set forth in claim 1, wherein the proportions of the constituents are substantially as follows: soluble silica, 60 parts; alumina, 10 parts; ferric oxide, 25 parts; titanic acid, 5 parts.

3. A process for avoiding the aging of molded Portland cement materials or objects after their impregnation with molten sulphur comprising adding to the unkneaded Portland cement a composition of soluble silica, alumina, ferric oxide and titanic acid and kneading the said cement with a solution of ferric chloride at 0.5%.

4. A composition comprising soluble silica, alumina, ferric oxide, titanic acid and Portland cement to which is added molten sulphur which operates to cause a final reaction of the soluble silica, alumina, ferric oxide and titanic acid on the said cement substantially as described.

ALDO BEGHELLI.